US008645333B2

(12) United States Patent
Balachandran et al.

(10) Patent No.: US 8,645,333 B2
(45) Date of Patent: Feb. 4, 2014

(54) METHOD AND APPARATUS TO MINIMIZE METADATA IN DE-DUPLICATION

(75) Inventors: Subashini Balachandran, Sunnyvale, CA (US); Mihail Corneliu Constantinescu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/129,432

(22) Filed: May 29, 2008

(65) Prior Publication Data
US 2009/0300321 A1    Dec. 3, 2009

(51) Int. Cl.
*G06F 7/02*    (2006.01)
*G06F 17/30*    (2006.01)

(52) U.S. Cl.
USPC ............................ 707/692; 709/247; 711/216

(58) Field of Classification Search
USPC .................... 707/692, 682; 709/247; 711/216
See application file for complete search history.

(56) References Cited

U.S. PATENT DOCUMENTS

| | | | |
|---|---|---|---|
| 5,502,439 A * | 3/1996 | Berlin | 341/51 |
| 5,701,125 A * | 12/1997 | Berlin | 341/63 |
| 5,850,565 A * | 12/1998 | Wightman | 710/1 |
| 6,209,000 B1 * | 3/2001 | Klein et al. | 707/741 |
| 7,152,165 B1 | 12/2006 | Maheshwari et al. | |
| 7,281,006 B2 | 10/2007 | Hsu et al. | |
| 7,519,635 B1 * | 4/2009 | Haustein et al. | 1/1 |
| 7,539,710 B1 * | 5/2009 | Haustein et al. | 1/1 |
| 7,797,279 B1 * | 9/2010 | Starling et al. | 707/641 |
| 2006/0004808 A1 | 1/2006 | Hsu et al. | |
| 2006/0047855 A1 * | 3/2006 | Gurevich et al. | 709/247 |
| 2006/0085561 A1 | 4/2006 | Manasse et al. | |
| 2006/0184652 A1 | 8/2006 | Teodosiu et al. | |
| 2006/0224846 A1 * | 10/2006 | Amarendran et al. | 711/162 |
| 2006/0230244 A1 * | 10/2006 | Amarendran et al. | 711/162 |
| 2007/0043757 A1 | 2/2007 | Benton et al. | |
| 2007/0250519 A1 | 10/2007 | Fineberg et al. | |
| 2007/0250674 A1 | 10/2007 | Fineberg et al. | |
| 2008/0098024 A1 * | 4/2008 | Kataoka et al. | 707/101 |
| 2009/0112945 A1 * | 4/2009 | Camble et al. | 707/204 |
| 2009/0216774 A1 * | 8/2009 | Rao et al. | 707/10 |
| 2009/0265399 A1 * | 10/2009 | Cannon et al. | 707/205 |

FOREIGN PATENT DOCUMENTS

WO    WO-03/036862 A1    5/2003

OTHER PUBLICATIONS

Chen et al., "Exploiting Relationships for Object Consolidation", 2005, ACM.*
Brizan et al., "Survey of Entity Resolution and Record Linkage Methodolgies", 2006, Communication of IIMA, vol. 6, Iss. 3.*

(Continued)

*Primary Examiner* — Christyann Pulliam
*Assistant Examiner* — Sheryl Holland
(74) *Attorney, Agent, or Firm* — Kenneth L. Sherman, Esq.; Michael Zarrabian, Esq.; Sherman & Zarrabian LLP (57) ABSTRACT

The invention provides a method for reducing identification of chunk portions in data de-duplication. The method includes detecting sequences of stored identification of chunk portions of at least one data object, indexing the detected stored identification of chunk portions based on a sequence type, encoding first repeated sequences of the stored identifications with a first encoding, encoding second repeated sequences of the stored identifications with a second encoding, and avoiding repeated stored identifications of chunk portions.

20 Claims, 7 Drawing Sheets

(56) References Cited

OTHER PUBLICATIONS

Thor et al., "MOMA—A Mapping-based Object Matching System", 2007, Conference on Innovative Data Systems Research.*

Balachandran et al. "Sequence of Hashes Compression in Data De-Duplication", Mar. 27, 2008, IEEE Data Compression Conference.*

Promod Mandagere, et al., Data De-Duplication using Object Based Storage, U5/18/07, pp. 1-20., www.dtc.umn.edu/disc/resources/DataDeDuplicationPosterISW5.pdf.

Jian Liang, et al., Minimizing Metadata Access Latency in Wide Area Networked File Systems, High Performance Computing, 2006, pp. 301-312, v. 4297, Springer-Berlin, Heidelberg.

* cited by examiner

METHOD AND APPARATUS TO MINIMIZE METADATA IN DE-DUPLICATION

BACKGROUND OF THE INVENTION

1. Field of the Invention

The present invention relates generally to de-duplication, and in particular to reducing identification of chunk portions in data de-duplication.

2. Background Information

De-duplication processes partition data objects into smaller parts (named "chunks") and retain only the unique chunks in a dictionary (repository) of chunks. To be able to reconstruct the object, a list of hashes (indexes or metadata) of the unique chunks is stored in place of original objects. The list of hashes is customarily ignored in the de-duplication compression ratios reported by various de-duplication product vendors. That is, vendors typically only report the unique chunk data size versus original size.

The list of hashes is relatively larger when smaller chunks are employed. Smaller chunks are more likely to match and can be used to achieve higher compression ratios. Known de-duplication systems try to diminish the significance of index metadata by using large chunk sizes, and therefore, accept lower overall compression ratios. Also, standard compression methods (LZ, Gzip, Compress, Bzip2, etc.) applied to the list of hashes perform poorly.

SUMMARY OF THE INVENTION

The invention provides a method and system for reducing identification of chunk portions in data de-duplication. One embodiment involves detecting sequences of stored identification of chunk portions of at least one data object, indexing the detected stored identification of chunk portions based on a sequence type, encoding first repeated sequences of the stored identifications with a first encoding, encoding second repeated sequences of the stored identifications with a second encoding, and avoiding repeated stored identifications of chunk portions.

In another embodiment of the invention, an apparatus for reducing an index of identifiers for chunk portions in de-duplication, is provided. The apparatus including a sequence identifier module that is configured to identify sequences of chunk portion identifiers of a data object, an indexing module that is configured to apply indexing to identification of chunk portions based on a sequence type, and an encoding module configured for encoding first repeated sequences with a first encoding, and encoding second repeated sequences with a second encoding, wherein storing repeated sequences of chunk portion identifiers is avoided.

Yet another embodiment of the invention provides a computer program product for reducing an index of identifiers for chunk portions in de-duplication. The computer program product when executed by a processor detects sequences of stored identification of chunk portions of data objects, indexes the existing stored identification of chunk portions based on a sequence type, encodes first repeated sequences of the stored identification of chunk portions with a first encoding, encodes second repeated sequences of the stored identification of chunk portions with a second encoding, and avoid storing of repeated identifications of chunk portions previously stored.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of reducing identification of chunk portions in data de-duplication, as well as operation and/or component parts thereof. While the following description will be described in terms of de-duplication reduction processes and devices for clarity and to place the invention in context, it should be kept in mind that the teachings herein may have broad application to all types of systems, devices and applications.

The invention provides a method and apparatus for reducing identification of chunk portions in data de-duplication. One embodiment involves detecting sequences of stored identification of chunk portions of at least one data object, indexing the detected stored identification of chunk portions based on a sequence type, encoding first repeated sequences of the stored identifications with a first encoding, encoding second repeated sequences of the stored identifications with a second encoding, and avoiding repeated stored identifications of chunk portions.

Figure 1A:
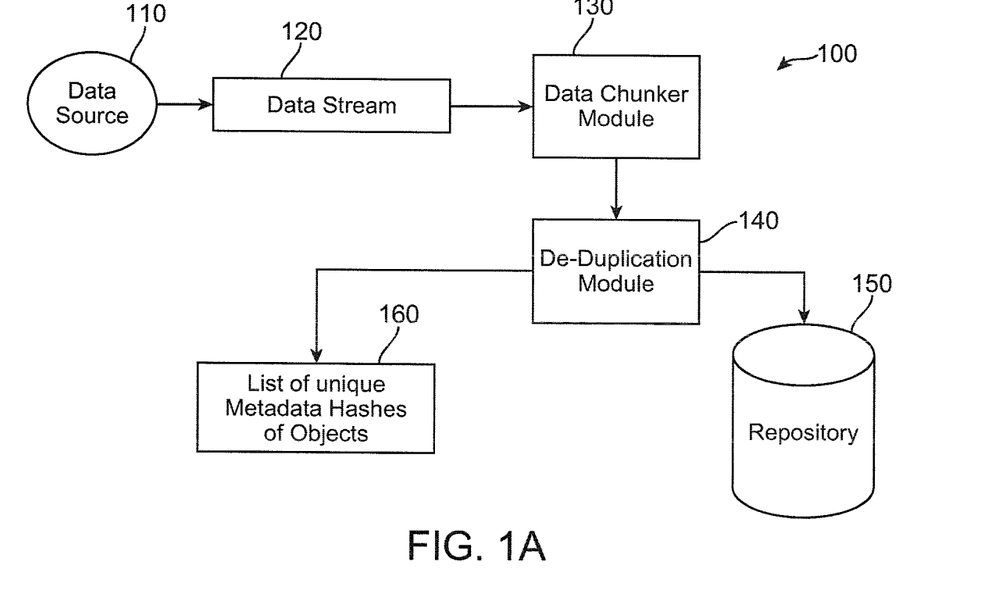
FIG. 1A illustrates an apparatus for reducing identification of chunk portions in data de-duplication of one embodiment.

FIG. 1A illustrates a block diagram of a device 100 for reducing identification of chunk portions in data de-duplication according to one embodiment. As illustrated, device 100 includes a data source 110. Data source 110 can be sources, such as uploaded/downloaded files (e.g., data files, video/audio files, streaming media, etc.) that can be resident or non-resident in device 100. In one embodiment, the data source is downloaded from a network (wired or wirelessly), such as the Internet, a local area network (LAN), wide area network (WAN), a disk, a disk drive, flash card, memory, etc. In one embodiment, from the data source 110 a data stream 120 is routed or transmitted to the data chunker module 130 for chunking the data in the data stream into smaller portions or chunks. From the chunker module, the chunked portions of data are forwarded to the de-duplication module 140. As will be discussed below (see FIGS. 2-5), the de-duplication module performs de-duplication of chunk portions in a storage repository 150 and updates a list 160 of unique metadata hashes of objects stored in the repository 150 (e.g. a database, an indexed database, relational database, look-up table, etc.).

In one embodiment, metadata includes descriptions, parameters, priority, date, time, and other pertinent information regarding chunked object portions. A hash is a transformation of a string of characters (e.g., metadata) into a shorter fixed-length value or key that represents the original string. In one embodiment, hashing is used to index and retrieve chunk portions in the repository 150. It should be noted that it is faster to find a chunk portion using the shorter hashed metadata than to find it using the original value. In one embodiment a hashing function is used to create an indexed version of the represented value of chunk portions of data objects. That is, a hash function is used to index the original value and then used later each time the data associated with the value is to be retrieved. In one embodiment, known hash functions are used, such as a division-remainder method, folding, radix transformation, digit rearrangement, etc. In another embodiment, encryption hash functions are used, such as MD2, MD4, MD5, the Secure Hash Algorithm (SHA), etc.

Figure 1B:
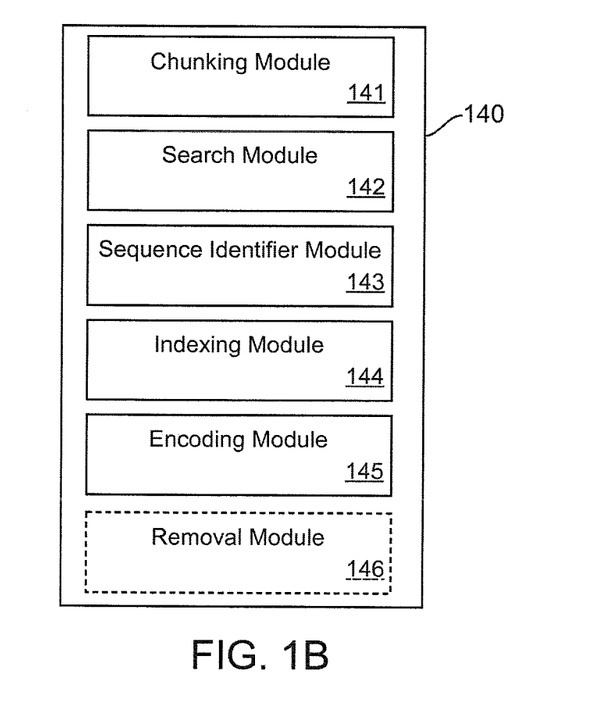
FIG. 1B illustrates a de-duplication module of the apparatus illustrated in FIG. 1A.

FIG. 1B illustrates a more detailed block diagram of de-duplication module 140 according to one embodiment of the invention. In this embodiment, the de-duplication module includes chunking module 141, search module 142, sequence identifier module 143, indexing module 144, encoding module 145 and a removal module 146. In one embodiment, the individual modules included in the de-duplication module 140 can be a software process, a hardware module or a combination of software and hardware. In one embodiment de-duplication module 140 reduces an index of identifiers for chunk portions in de-duplication where the identifiers are metadata hashes of objects. The chunking module 141 is configured to create smaller chunk portions from chunks received from data chunker module 130. In another embodiment, the chunking module 141 performs chunking of an input stream of larger chunks by one or more of: fixed size chunking, sliding window chunking, variable size chunking and content dependent chunking, in order to reduce the input stream of chunk portions to smaller chunk portions.

In one embodiment of the invention, the search module 142 searches the repository 150 to find matching chunks to a chunk originally destined for the repository 150. In one embodiment the sequence identifier module 143 that operates to identify sequences of chunk portion identifiers of a data object. The indexing module 144 operates to apply indexing to identification of chunk portions based on a chunk repeating sequence type according to one embodiment of the invention. In another embodiment of the invention, the stored identification (e.g., hashed metadata) of chunk portions includes a chronological pointer linking newly added identification of chunk portions in chronological order. In one embodiment of the invention the encoding module 145 is connected to the indexing module 144 and the encoding module 145 operates to encode first repeated chunk sequences with a first encoding and encodes second repeated chunk sequences with a second encoding, and repeated sequences of chunk portion identifiers are removed from a memory to reduce storage use. The second encoding identifies the first appearance of the first repeated sequences of chunk portions according to one embodiment of the invention. In another embodiment of the invention, the second encoding includes a distance offset from a first appearance of a repeated chunk portion to a second appearance of the repeated chunk portion. In one embodiment of the invention, the sequence type is assigned based on a length of repeated chunk identification. In one embodiment an optional removal module 146 removes repeated chunk portions from the repository 150 to reduce stored chunk portions stored in the repository 150. In other embodiments, removal of repeated chunk portions from the repository 150 is not necessary as the repeated chunk portions have their associated hashed metadata encoded and the storage in the repository 150 of a repeated chunk portion is avoided, therefore removal is unnecessary.

In one embodiment a file system operates to store the list of chunk portion identifiers. In another embodiment, a module, process or application operates to store the list of chunk portion identifiers. In one embodiment, device 100 implements processes 300, 400, 500, or any combination (see FIGS. 3-5). In one embodiment, device 100 is implemented in a server, a client, a server and client, a personal computer, a personal computing device, a portable computing device, a networked system, a distributed system, etc.

Figure 2:
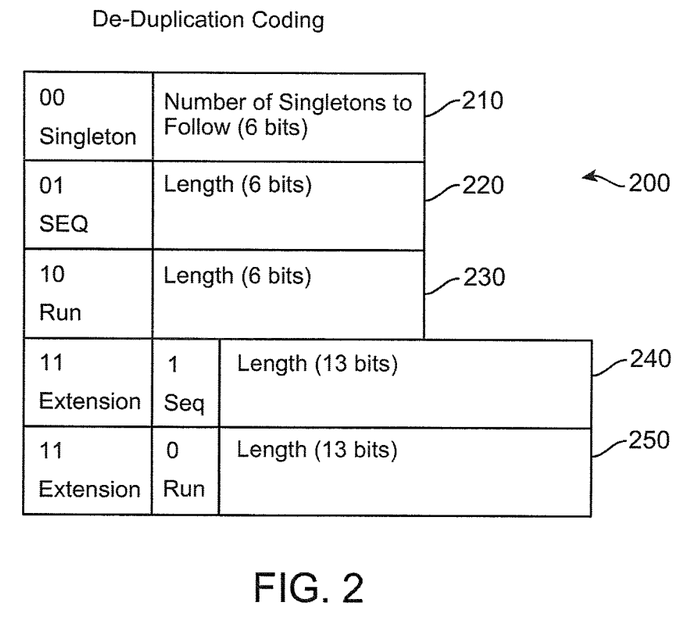
FIG. 2 illustrates a plurality of fields for de-duplication coding, according to an embodiment of the invention.

FIG. 2 illustrates an embodiment of de-duplication coding 200 of a unique chunk portion of a data object and sequences of unique chunk portions of objects to reduce storage of the list of identifiers and chunk portions in a list 160. As illustrated, the coding 210 for the number of "singletons" (single unique chunk portions without a repeated sequence) is set to 0. In this embodiment singleton hashes are output separately. However, the coding syntax allows outputting a string of maximum 64 singleton hashes without separator bytes following them. In one embodiment, the singleton hashes are buffered for large strings of singletons. The coding 220 for sequenced chunk portions is set as a minimum to two (2) with a string maximum of 64 sequenced hashes for repeated chunk portions. The coding 230 for a run of at least four (4) chunk portions being repeated in a sequence is followed by a string maximum of 64 sequenced hashes for repeated runs of chunk portions. Coding 240 shows an extension of at least 6 bits for sequences and is followed by a maximum of 13 bits. Coding 250 shows an extension of at least 6 bits for run sequences and is followed by a maximum of 13 bits. In this embodiment, by coding duplicated sequences and runs of chunk portions, the repeated chunk portions can be removed from a repository 150 with only the indexing being stored in a list 160.

Figure 3A:
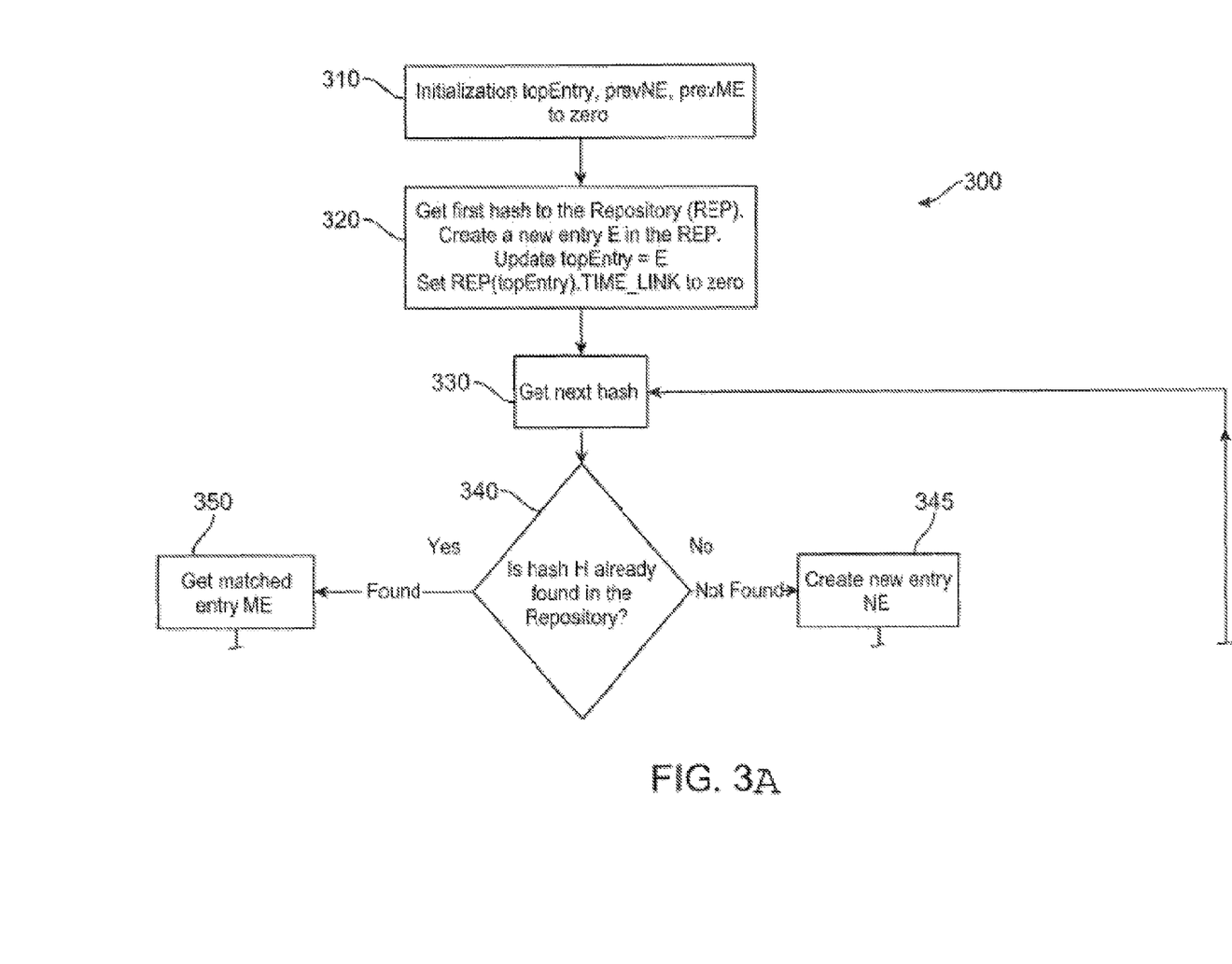
FIGS. 3A-B illustrate a block diagram of a searching process of an embodiment of the invention.
Figure 3B:
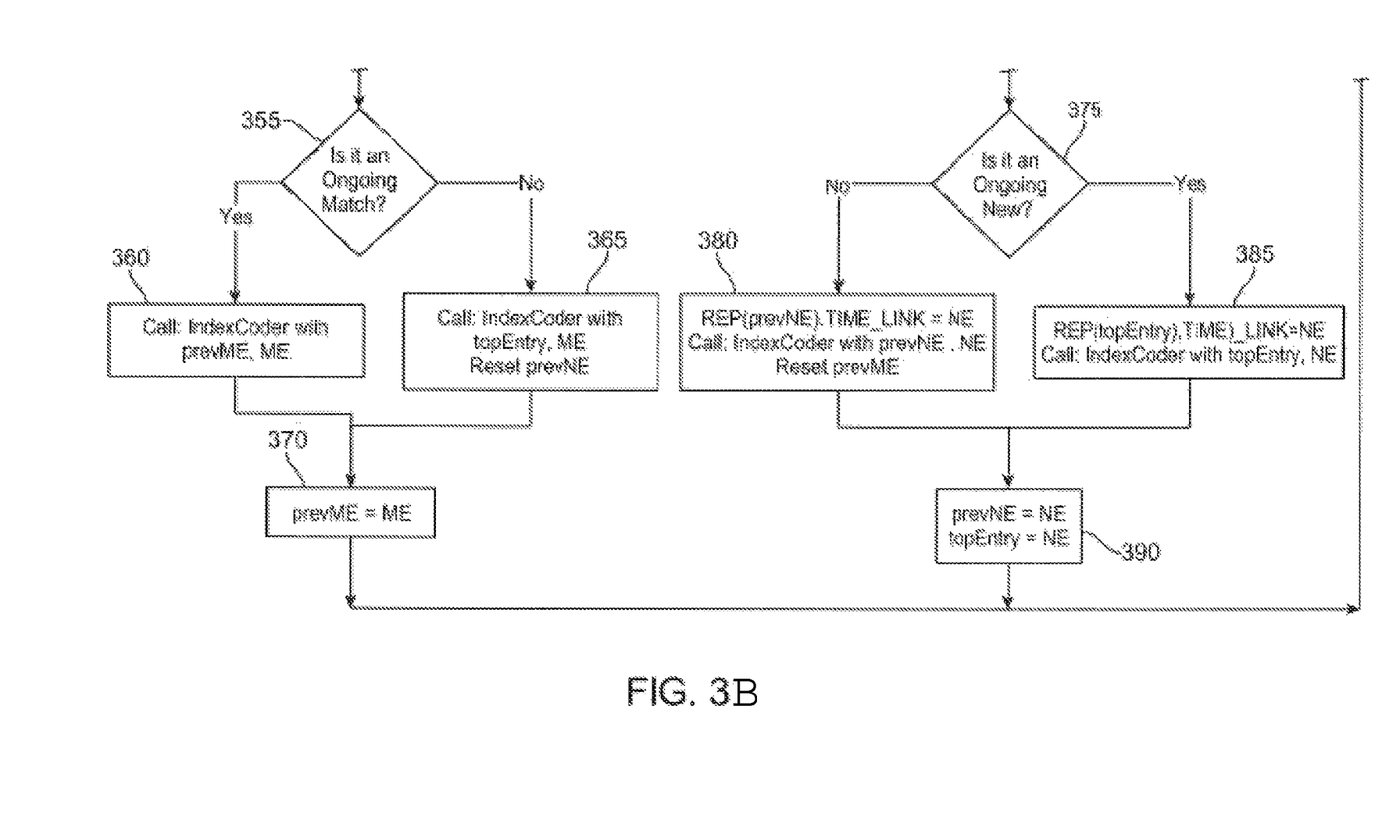

FIGS. 3A-B illustrate a block diagram of a searching process 300 of an embodiment of the invention. Searching process 300 can be performed in a module of hardware, such as in search module 142, or performed from a computer program product accessible from a computer-usable or computer-readable medium providing program code for use by or in connection with a computer, processing device, or any instruction execution system. Process 300 begins with block 310 where initialization first occurs. Table I illustrates the notation that is used for ease of understanding process 300.

TABLE I

| Notation | Meaning |
| --- | --- |
| REP(x) | Repository entry x |
| topEntry | Top entry in the repository |
| prevNE | Previous new entry created in the repository |
| prevME | Previous matched entry in the repository |
| NE | New entry created in the repository |
| ME | Current matched entry in repository |

In one embodiment, values for: the top entry (topEntry) in a repository (e.g., repository 150), a previous new entry (prevNE) created in the repository, previous matched entry (prevME) in the repository are each set to zero ("0"). Process 300 then continues with block 320.

In block 320, the first index (e.g., metadata hash) is retrieved from a chunking module (e.g., chunking module 141), a new entry (E) is created in the repository (REP), and the top entry is set to point to this new entry (i.e., topEntry=E). Additionally, a "TIME_LINK" field of the first entry in the repository is set to zero ("0") (REP(topEntry). TIME_LINK=0. In block 330, the next index (metadata hash) is retrieved from the chunking module. Process 300 then continues with block 340.

In block 340, it is determined whether the next index received from the chunking module already is found to exist in the repository. If the index is found in the repository, process 300 continues with block 350, otherwise process 300 continues with block 345. In block 350, the matched entry (ME) is retrieved from the repository. In block 355, it is determined whether the matched entry is an ongoing match. That is, the previous search was also successful (i.e., "a match"). If it is determined that the ME is an ongoing match, process 300 continues with block 360. In block 360, an index coder process (see FIGS. 4A-B process 400) is called and applied as illustrated in FIG. 2 for the previous matched entry (prevME) and the current matched entry (ME). Then in block 370 the previous matched entry is set equal to the current matched entry (prevME=ME).

If it was determined that the matched entry is not an ongoing match, in block 365 the index coder process (see FIGS. 4A-B process 400) is called and applied as illustrated in FIG. 2 for the top entry (topEntry) and the current matched entry (ME), and the previous next entry is reset to zero ("0"). Then in block 370 the previous matched entry is set equal to the current matched entry (prevME=ME).

If the index (metadata hash) was not found in the repository, block 345 creates a new entry (NE). Process 300 continues with block 375 where it is determined whether the new entry is an ongoing new entry. That is, the previous repository search failed to find a match so a new entry was also created. If it is determined that the new entry is an ongoing entry, process 300 continues with block 385, otherwise process 300 continues with block 380.

In block 385, the repository value of the previous new entry in chronological order is set to the new entry created in the repository (REP(prevNE).TIME_LINK=NE) and the index coder process (see FIGS. 4A-B process 400) is called and applied as illustrated in FIG. 2 for the previous new entry and the new entry. In block 390, the previous new entry is set equal to the new entry and the top entry is set equal to the new entry (topEntry=NE, prevNE=NE). If it was determined that the new entry is not an ongoing entry, in block 380 the repository value for the top entry in chronological order set equal to the new entry (REP(topEntry).TIME_LINK=NE) and the index coder process (see FIGS. 4A-B process 400) is called and applied as illustrated in FIG. 2 for the top entry and the new entry, and the previous matched entry is set equal to zero ("0") (prevME=0). Next, process 300 continues with block 390 where the previous new entry is set equal to the new entry and the top entry is set equal to the new entry (topEntry=NE, prevNE=NE).

Figure 4A:
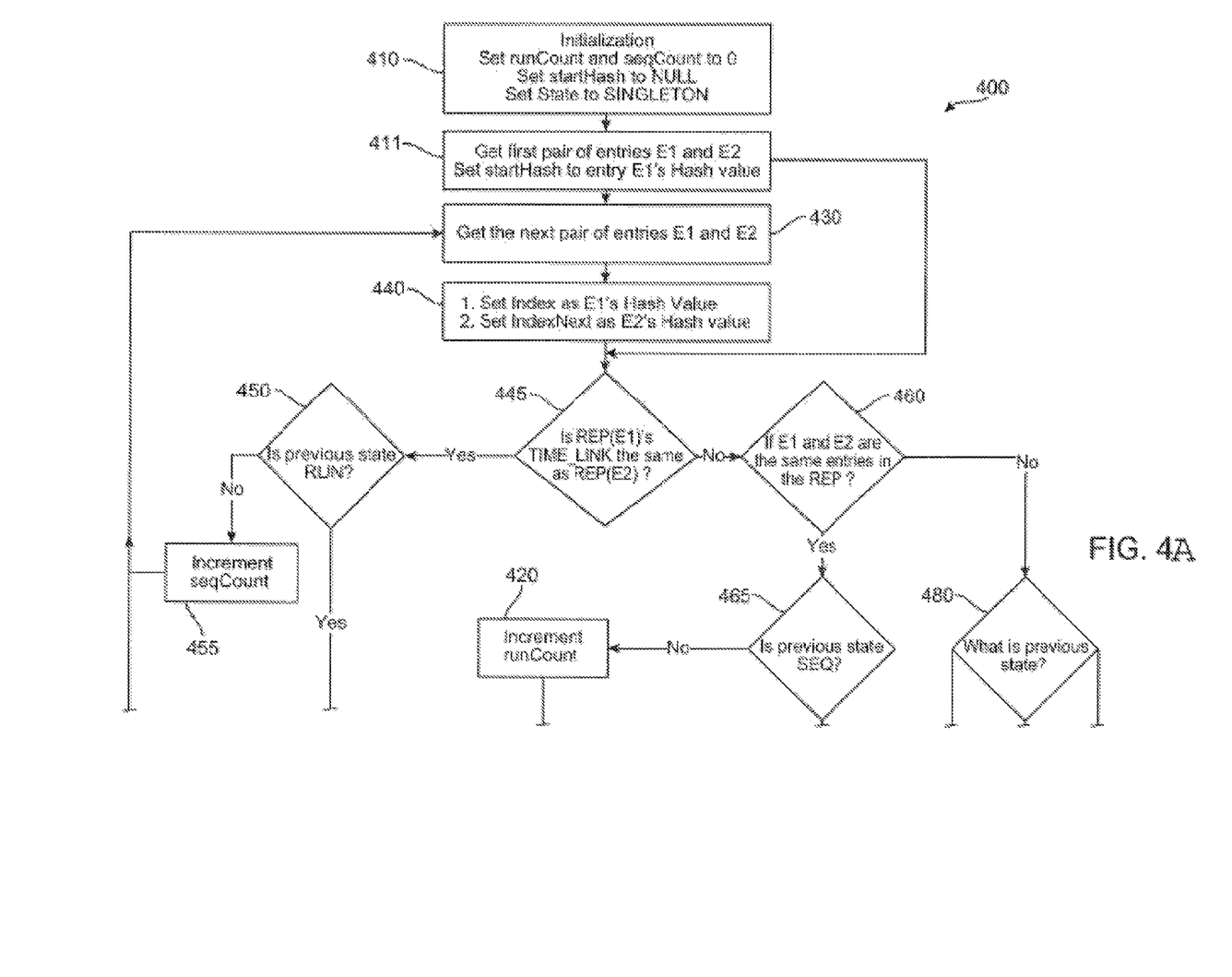
FIGS. 4A-B illustrate a block diagram of a first encoding process of an embodiment of the invention.
Figure 4B:
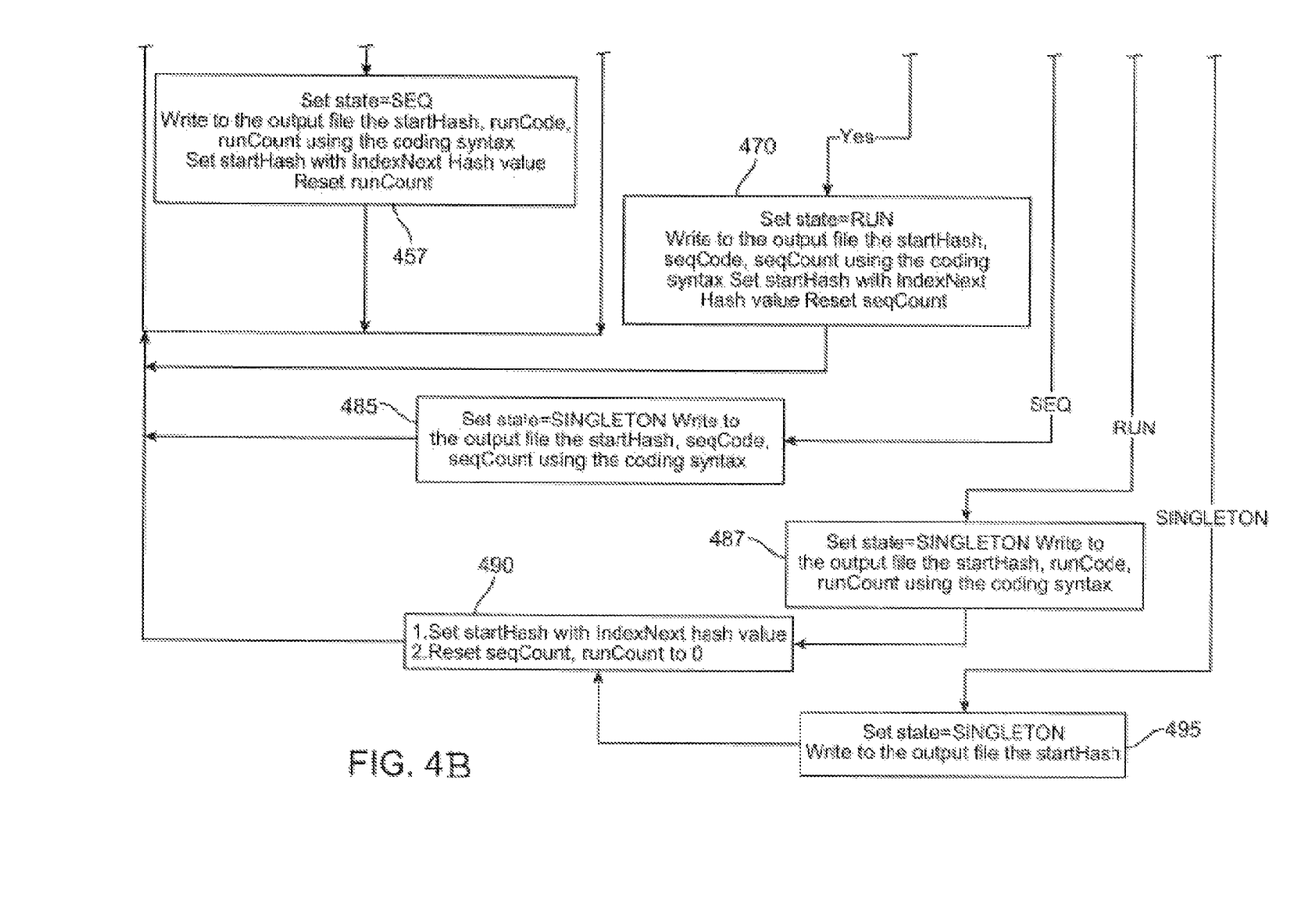

FIGS. 4A-B illustrates an embodiment of an index coder process 400. Table II illustrates notations used for ease of understanding process 400. Process 400 begins with block 410 where initialization is handled. In block 410, state counts for runs and sequences (runCount, seqCount) are set to zero "0"), the state is set to SINGLETON, and the hash values of the given repository entry (startHash) are set to NULL.

TABLE II

| Notation | Meaning |
| --- | --- |
| E1, E2 | Chunk portion entries to the repository |
| State | SEQ, RUN or SINGLETON |
| runCount | Length of runs of identical hashes |
| seqCount | Length of sequences of hashes |
| runCode | See coding syntax in FIG. 2 |
| seqCode | See coding syntax in FIG. 2 |
| singletonCode | See coding syntax in FIG. 2 |
| startHash | Hash values of the given Repository entry |

In block 411, the first pair of entries, E1 and E2, are retrieved from the repository and the startHash are set to the hash value of E1. Process 400 continues with block 445. In block 445, it is determined if the two entries are chronologically related. If it is determined that the two entries are chronologically related, process 400 continues with block 450, otherwise process 400 continues with block 460. In block 450, it is determined if the previous state is RUN. If it is determined that the previous state is RUN, process 400 continues with block 457, otherwise process 400 continues with block 455. In block 455, the sequence counter (seqCount) is incremented and process 400 continues to block 430. In block 430, the next pair of entries E1 and E2 are retrieved from the repository. In block 440, the index is set to the hash value of E1, and the IndexNext is set to the hash value of E2.

If it was determined that the previous state was RUN, in block 457 the state is set to sequence (SEQ), the startHash, runCode and runCount values are written to an output file using the coding described in FIG. 2, startHash is set to the IndexNext hash value, and the runCount is reset to zero ("0"). Process 400 then continues to block 430. If the determination in block 445 is negative, process 400 continues with block 460.

In block 460, it is determined if E1 and E2 are the same entries in the repository (i.e., equivalent object portions). If it is determined that E1 and E2 are equivalent, process 400 continues with block 465 where it is determined if the previous state was sequence (SEQ), otherwise process 400 continues to block 480. In block 465, if it is determined that the previous state is not SEQ, runCount 420 is incremented and process 400 continues with block 430. If it is determined in block 465 that the previous state was SEQ, in block 470 the state is set to RUN, startHash, seqCode and seqCount are written to an output file using the coding as illustrated in FIG. 2, startHash is set to the hash value of IndexNext, and seqCount is reset to zero ("0"). Process 400 then continues to block 430. In block 430, the next pair of entries E1 and E2 are retrieved from the repository. In block 440, the index is set to the hash value of E1, and the IndexNext is set to the hash value of E2.

In block 480, it is determined what the previous state of the entries in the repository were. In the case where the previous state is determined to be SEQ, process 400 continues to block 485 where the state is set to SINGLETON, startHash, seqCode and seqCount are written to an output file using the coding as illustrated in FIG. 2, and process 400 continues to block 430. If it is determined that the previous state is RUN, process 400 continues to block 487.

In block 487, the state is set to SINGLETON, and startHash, seqCode and seqCount are written to an output file using the coding as illustrated in FIG. 2, and process 400 continues to block 490. In block 490, startHash is set equal to the hash value of IndexNext, seqCount and runCount are both reset to zero ("0"), and process 400 continues to block 430. If the previous state is determined to be SINGLETON in block 480, process 400 continues to block 495. In block 495 the state is set to SINGLETON and the startHash value is written to the output file. Process 400 then continues with block 490, where the startHash is set equal to the hash value of IndexNext, seqCount and runCount are both reset to zero ("0"), and process 400 continues to block 430.

It should be noted that different embodiments of the invention can use different ways to find repeated substrings in the index list of metadata hashes generated by a de-duplication system. The input of the different embodiments is the list of hashes metadata generated by a de-duplication system and the output comprises of hashes separated by one or more separator bytes, for example, using the following format: (1 byte): Singleton (0)|number of singletons (7 bit), (3 bytes): Copy (1)|back_pointer(15 bit)|length(8 bit), where Singleton means individual hashes (eventually grouped), and "Copy back_pointer, length" means that a substring of "length" of hashes starting "back_pointer" hashes behind the current position in the list of hashes to be replicated starting at the current position. In one embodiment, a "sliding window" is used of size 2*K, where K is the maximum distance between repeated substrings willing to be searched (this giving the back_pointer size, so for 15 bits as exemplified in the coding syntax illustrated in FIG. 2, 32K hashes behind).

Figure 5:
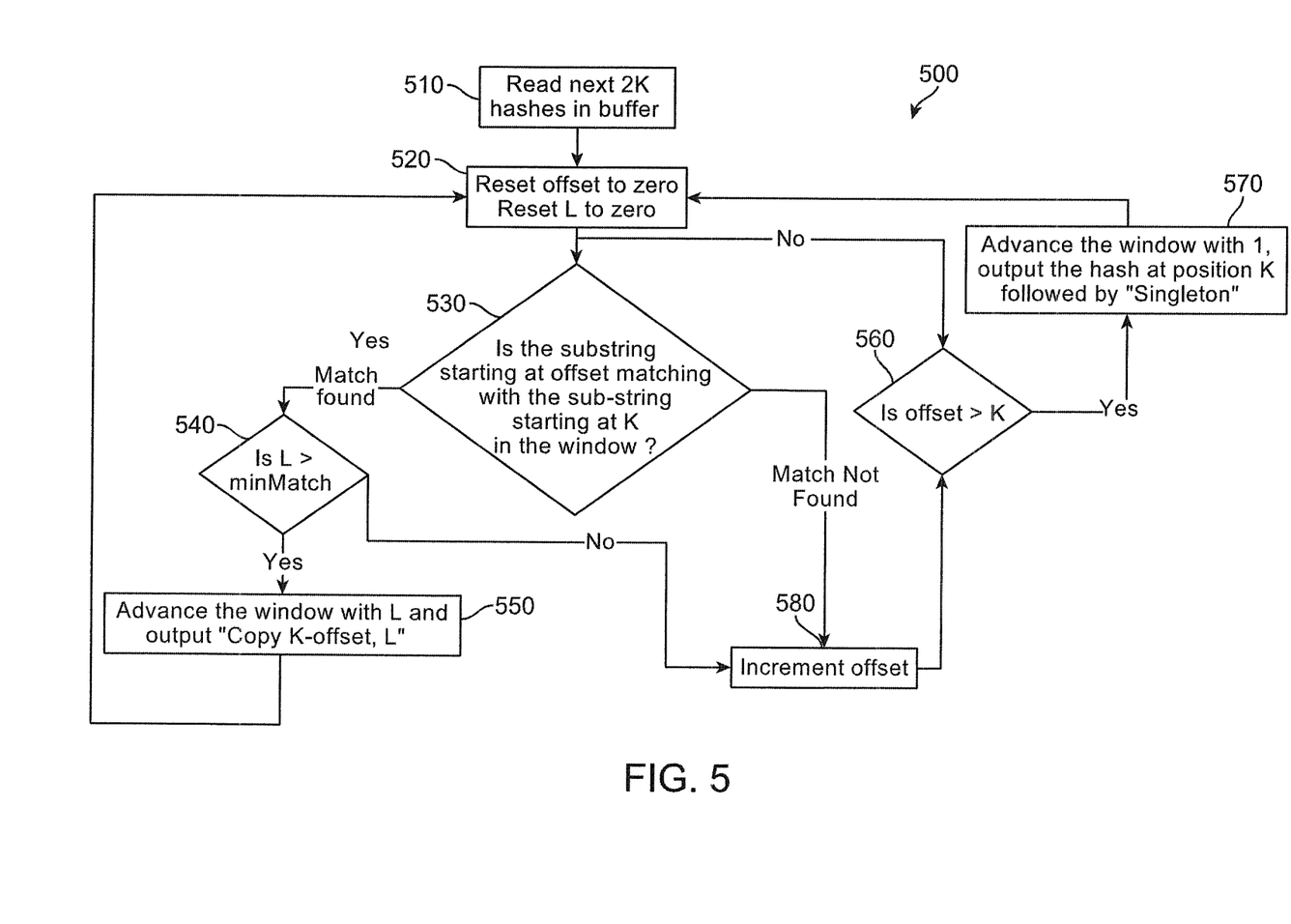
FIG. 5 illustrates a block diagram of a second encoding process of an embodiment of the invention.

FIG. 5 illustrates an embodiment of the invention with encoding process 500. Process 500 begins with block 510 where the next portion of indexes (hashes of metadata) are read in a buffer. In one embodiment the portion read has a size of a "sliding window" 2K, where K is a predetermined threshold equal to the maximum distance between repeated substrings to search. In one embodiment, for example in daily backup, K would have as value the size of the list of hashes generated in the previous day. Next, in block 520 an offset is set to zero ("0"), and the number of matches (L) is set to zero ("0"). Process 500 continues with block 530 where it is determined if an index substring (metadata hash) starting at the offset matches an index substring starting at K in the window. If it is determined that a match does exist, process 500 continues with block 540, otherwise process 500 continues with block 580.

In block 580, the offset is incremented by a predetermined amount (e.g., by 1) and process 500 continues with block 560. In block 560 it is determined if the offset is greater than K. If it is determined that the offset is not greater than K, process 500 continues to block 530, and otherwise process 500 continues with block 570. In block 570, the window is advanced by one ("1"), and the index hash value is output at position K followed by "Singleton." Process 500 then continues to block 520.

If it was determined that a match was found in block 530, in block 540 it is determined if L is greater than the minimum number of matches, such as five ("5"), six ("6"), seven ("7"), etc., process 500 continues with block 550, otherwise process 500 continues with block 580, as previously described. In block 550, the window is advanced by the value of L and "Copy (K-offset), L".

In one embodiment, when the workload consists of versions of an object, the best metadata reduction results are achieved when K reflects the version boundaries of the underlying workload. Some embodiments use standard linear time methods and processes to find the "maximal" repeated substrings employing suffix trees data structures or even suffix arrays that use less space than the trees. To use these embodiments, however, an ordered alphabet is used, which is not the case for hashes. In one embodiment integers are associated to the hashes for this purpose, where equal (integer) indexes are assigned to equal hashes (e.g., by using an index field in the hash table (Repository) entries and outputting it the same time with the hashes).

In one embodiment, process 300 can be used either separately from process 500 or in combination. In one embodiment, process 300 compresses a hash stream very well when the de-duplication ratio is not so good (i.e., when few matches exist between chunk portions, for example when backing up the first version of a workload), while process 500 works best when there are lots of matches of new chunk portions in the repository, which lead to high de-duplication ratios. In this regard, processes 300 and 500 complement each other.

The various embodiments of the invention reduce the index metadata by exploiting the temporal and spatial locality of the data chunk portions added to the repository. In one embodiment, process 500 acts as a second pass over the list of hashes or part of it. In one embodiment of the invention the time locality of new blocks added to the repository is used to reduce the index (metadata hash). In this embodiment a "chronological" pointer is added to the repository (hash table) entries linking the new created entries in chronological order. When the hashes produced by the chunking module follow the chronological pointers they are encoded as a "sequence of hashes," by specifying the first hash in the sequence and the length of the sequence, or when the same hash is generated repeatedly it is encoded as a "run," by specifying its value and the number of repeated occurrences.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that his invention not be limited to the specific constructions and arrangements shown and described, since various other modifications may occur to those ordinarily skilled in the art.

What is claimed is:

1. A method of reducing identification of chunk portions in data de-duplication, comprising:
    detecting sequences of stored identification of chunk portions of at least one data object in a repository, wherein the detected sequences of stored identification of chunk portions each include a transformation of metadata information and a chronological pointer linking newly added identification of chunk portions to one another in chronological order, wherein the newly added identification of chunk portions comprises identifications of chunk portions created in the repository;
    determining if stored chunk portions are chronologically linked based on each respective chronological pointer;
    applying indexing to the detected stored identification of chunk portions based on a repeating sequence type and whether the chunk portions are chronologically linked;
    encoding first type of repeated sequences of said stored identifications with a first encoding;
    encoding second type repeated sequences of said stored identifications with a second encoding; and
    avoiding repeated storage of identifications of chunk portions based on the repeating sequence type and chronological pointers of the stored identification of chunk portions, wherein the first encoding comprises a first encoding length and a first extension coding length, the second encoding comprises a second encoding length and a second extension length, and the first encoding length is less than the first extension encoding length, and the second encoding length is less than the second extension encoding length.

2. The method of claim 1, wherein the second encoding identifies the first appearance of first repeated sequences of chunk portions.

3. The method of claim 2, wherein the second encoding includes a distance offset from a first appearance of a repeated chunk portion to a second appearance of the repeated chunk portion.

4. The method of claim 3, wherein the first encoding comprises coding a minimum sequence of two repeated chunk portions, and the second encoding comprises a minimum sequence of four repeated chunk portions.

5. The method of claim 4, wherein the repeating sequence type is assigned based on a length of repeated identification.

6. The method of claim 1, wherein the transformation of metadata information comprises a hash of the metadata information.

7. The method of claim 1, further comprising:
    performing chunking of an input stream by one or more of: fixed size chunking, sliding window chunking, variable size chunking and content dependent chunking, to reduce the input stream to the chunk portions.

8. The method of claim 1, wherein said avoiding repeated storage of identifications of chunk portions further comprises removing repeated identifications of chunk portions from the repository.

9. An apparatus for reducing an index of identifiers for chunk portions in de-duplication, comprising:
    a processor coupled with
        a sequence identifier module configured to identify sequences of chunk portion identifiers of a data object in a repository, wherein the identified sequences of chunk portion identifiers each include a transformation of metadata information and a chronological pointer linking newly added identification of chunk portions to one another in chronological order, wherein the newly added identification of chunk portions comprises identifications of chunk portions created in the repository;
        an indexing module configured for determining if chunk portions are chronologically linked based on each respective chronological pointer and for applying indexing to identification of chunk portions based on a repeating sequence type and whether the chunk portions are chronologically linked; and
        an encoding module configured to encode first type repeated sequences with a first encoding and encodes second type repeated sequences with a second encoding,
    wherein storing repeated sequences of chunk portion identifiers is avoided based on the repeating sequence type and chronological pointers of the stored identification of chunk portions, and wherein the first encoding comprises a first encoding length and a first extension coding length, the second encoding comprises a second encoding length and a second extension coding length, wherein the first encoding length is less than the first extension encoding length, and the second encoding length is less than the second extension encoding length.

10. The apparatus of claim 9, wherein a file system operates to store the chunk portion identifiers in the repository.

11. The apparatus of claim 9, further comprising a chunking module configured for creating chunk portions from a data input stream, wherein the first encoding comprises coding a minimum sequence of two repeated chunk portions, and the second encoding comprises a minimum sequence of four repeated chunk portions.

12. The apparatus of claim 9, further comprising: a removal module configured to remove repeated sequences of chunk portion identifiers from the repository, wherein said storing repeated sequences of chunk portion identifiers is avoided by removing repeated sequences of chunk portion identifiers from the repository.

13. The apparatus of claim 9, further comprising a chunking module configured to adjust chunk portion sizes.

14. The apparatus of claim 9, further comprising a search module configured to find matching chunk portions in the repository.

15. A computer program product comprising a non-transitory computer usable medium including a computer readable program, wherein the computer readable program when executed on a computer causes the computer to:
- detect sequences of stored identification of chunk portions of data objects in a repository, wherein the stored identification of chunk portions each include a transformation of metadata and a chronological pointer linking newly added identification of chunk portions to one another in chronological order, wherein the newly added identification of chunk portions comprises identifications of chunk portions created in the repository;
- determine if stored chunk portions are chronologically linked based on each respective chronological pointer;
- apply an index to the existing stored identification of chunk portions based on a repeating sequence type and whether the chunk portions are chronologically linked;
- encode first type repeated sequences of said stored identification of chunk portions with a first encoding;
- encode second type repeated sequences of said stored identification of chunk portions with a second encoding, wherein the first encoding comprises a first encoding field length and a first extension coding field length, the second encoding comprises a second encoding field length and a second extension coding field length, wherein the first encoding field length is less than the first extension encoding field length, and the second encoding field length is less than the second extension encoding field length; and
- avoid storing of repeated identifications of chunk portions based on the repeating sequence type and chronological pointers of the stored identification of chunk portions.

16. The computer program product of claim 15, wherein the second encoding identifies the first appearance of first repeated sequences of chunk portions.

17. The computer program product of claim 16, wherein the second encoding includes a distance offset from a first appearance of a repeated chunk portion to a second appearance of the repeated chunk portion.

18. The computer program product of claim 17, wherein the first encoding comprises coding a minimum sequence of two repeated chunk portions, and the second type of encoding comprises a minimum sequence of four repeated chunk portions.

19. The computer program product of claim 15, wherein said avoid storing of repeated identifications of chunk portions comprises removing repeated identifications of chunk portions previously stored.

20. The computer program product of claim 15, further comprising:
- chunking of an input stream based on one or more of: fixed size chunking, sliding window chunking, variable size chunking and content dependent chunking, to reduce the input stream to the chunk portions.

* * * * *